(12) United States Patent
Thorstens et al.

(10) Patent No.: US 6,179,468 B1
(45) Date of Patent: Jan. 30, 2001

(54) PLAIN BEARING BRAKE-TENSIONER

(76) Inventors: Dale Thorstens, 1319 Widergren Dr., Rockford, IL (US) 61108; Donn Woodworth, 3360 Cornelia Ave., Rockford, IL (US) 61102

(*) Notice: Under 35 U.S.C. 154(b), the term of this patent shall be extended for 0 days.

(21) Appl. No.: 09/377,978

(22) Filed: Aug. 20, 1999

Related U.S. Application Data

(60) Provisional application No. 60/097,201, filed on Aug. 20, 1998.

(51) Int. Cl.$^7$ .................................................. F16C 29/02
(52) U.S. Cl. .............................................................. 384/40
(58) Field of Search ................................. 384/40, 39, 41, 384/42, 29, 57

(56) References Cited

U.S. PATENT DOCUMENTS

| | | | |
|---|---|---|---|
| 1,285,628 | * | 11/1918 | Craley ..................................... 384/39 |
| 3,095,247 | * | 6/1963 | von Zelewsky ........................ 384/40 |
| 4,518,205 | * | 5/1985 | Heathe .................................... 384/29 |
| 4,773,769 | * | 9/1988 | Church ................................... 384/42 |
| 4,941,758 | * | 7/1990 | Osawa .................................... 384/40 |
| 5,297,873 | * | 3/1994 | Komiya .................................. 384/45 |

* cited by examiner

Primary Examiner—Thomas R. Hannon

(57) ABSTRACT

A plain bearing is slidably positioned substantially surrounding a guide rail for linear movement along the axis thereof. A slider assembly includes a housing, the plain bearing positioned in the housing and provided with an axially extending slit, and adjustable closure apparatus grounded to the housing and operatively engaging the bearing for adjustably closing the slit in the bearing to effect clearance reduction and/or braking between the bearing and the guide rail.

20 Claims, 6 Drawing Sheets

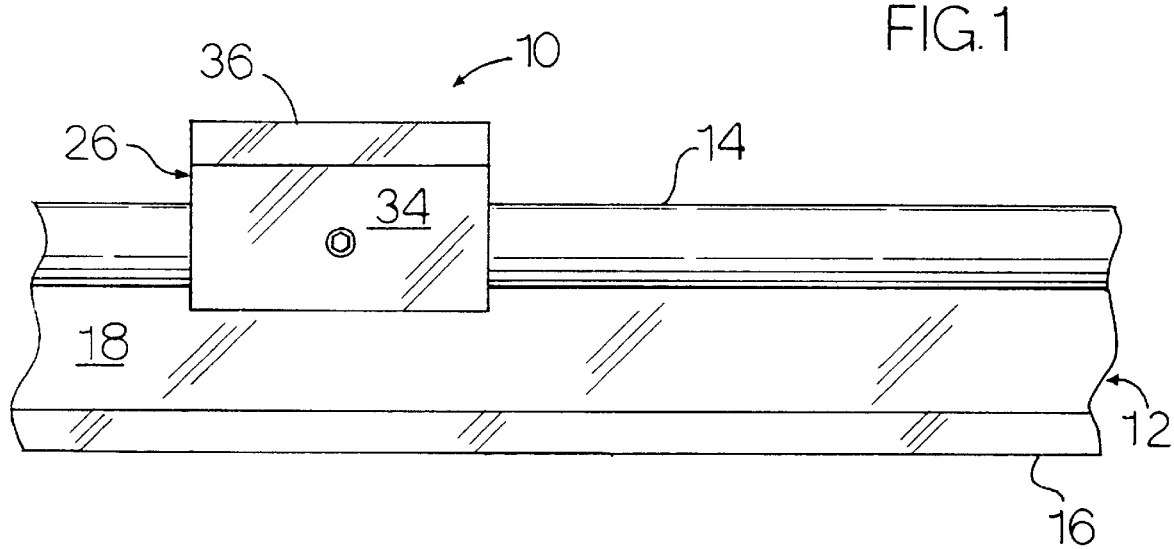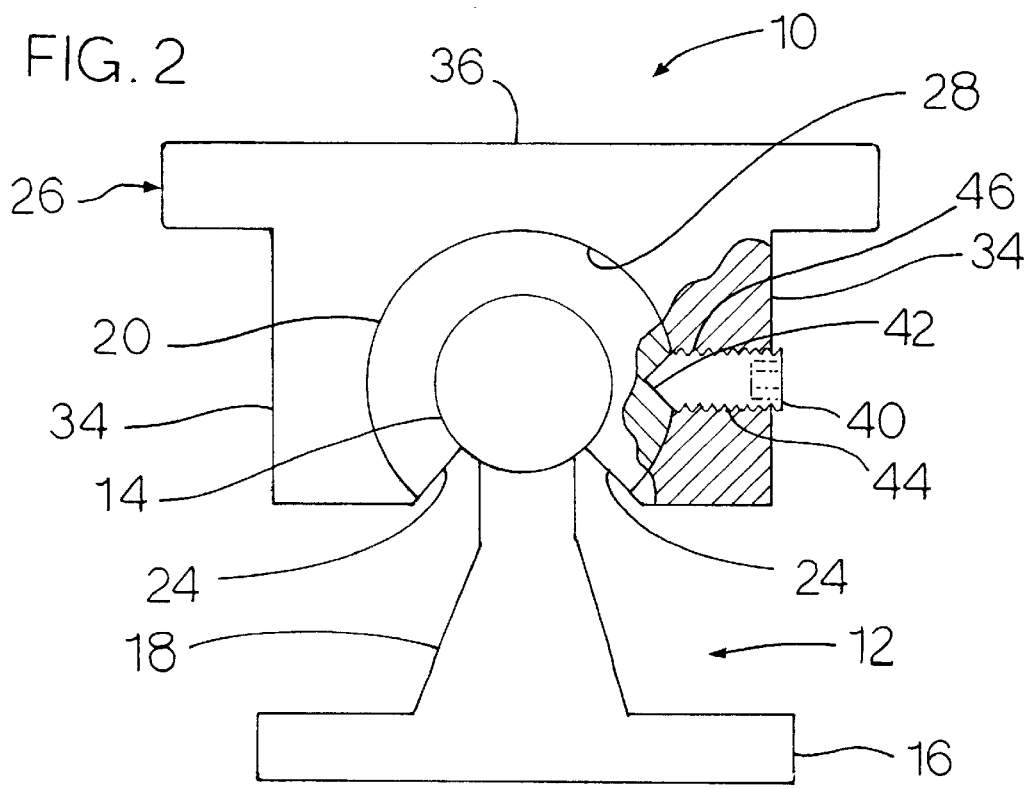

PLAIN BEARING BRAKE-TENSIONER

Provisional Application No. 60/097,201 filed Aug. 20, 1998.

BACKGROUND OF THE INVENTION

1. Field of Invention

The present invention relates generally to accessory apparatus for use with a plain bearing located in a housing and slidably positioned on a shaft or guide member. More particularly, the invention relates to apparatus adapted for adjusting the running clearance between the bearing and the shaft, and for optionally provide a frictional drag and/or braking force between the bearing and shaft; and which, while suitable for other uses, is particularly useful in connection with adjusting the running clearance and/or braking linear slides provided with plain bearings sliding on a guide rail.

2. Description of Prior Art

Plain bearings are often used for either slidably or rotatably supporting a shaft member in a stationary housing, or slidably or rotatably supporting a housing member on a stationary shaft. In such arrangements, it is desirable at times to stop the relative motion between the housing and the shaft, or to provide a frictional drag to resist the relative motion. At present, suitable friction and braking apparatus may be embodied in a separate unit, or may involve a clutch or conventional braking arrangement, and may be relatively complicated and expensive. Thus, there is a need for a simple, relatively inexpensive means for applying a frictional drag between the bearing and shaft, and for optionally applying sufficient friction to act as a braking force.

It is also well known that plain bearings have a limited life as a result of wear. Bearings are installed with an initial shaft clearance which tends to increase from extended use. Accommodation of an acceptable level of wear is typically taken into account in design of any particular arrangement, and the bearing is then typically replaced when the wear exceeds an allowable limit. It is apparent that a simple, relatively inexpensive apparatus adapted to adjust the clearance between the bearing and shaft, to accommodate wear and prolong the useful life of the bearing, would reduce bearing replacement costs, and in many instances, reduce the overall long-term cost of operation.

One common use for plain bearings is in connection with linear slides. A typical linear slide arrangement includes a stationary shaft or other stationary guide rail, and a housing slidably positioned on the guide rail with one or more plain bearings. For example, Komiya, U.S. Pat. No. 5,297,873 discloses a linear motion slide with generally rectangular guide rail and a separate slide stop assembly.

Osawa, U.S. Pat. No. 4,941,758 discloses a linear slide and guide rail arrangement in which the slide housing is provided with a slit defining outer and inner side wall portions, and a pressing bolt adapted to elastically deform the inner wall portion for adjusting the gap between the bearing and the guide rail. While the Osawa arrangement is an improvement for certain arrangements over the prior art, a simpler arrangement which avoids the need to form the slotted sidewall, but which is adapted to adjust the clearance between the bearing and shaft is desirable to further reduce the cost of clearance adjustable sliders.

From the foregoing, it is clear there is a need for a simple, and relatively inexpensive arrangement adapted to adjust the clearance between a plain bearing and associated shaft, and which is further adapted to apply a frictional drag and optionally a braking force between the bearing and the shaft.

SUMMARY OF THE INVENTION

The general aim of the present invention is to provide a new and improved apparatus adapted for adjusting the running clearance between a plain bearing and a shaft or guide rail, and for applying a frictional drag or braking force as desired.

A detailed objective is to achieve the foregoing by providing apparatus connected to the housing and operatively engaging a split bearing located in the housing for effecting closure of the bearing to reduce the clearance or impart a friction between the bearing and the shaft.

These and other objectives and advantages of the invention will become more apparent from the following detailed description when taken in conjunction with the accompanying drawings.

Briefly, in a preferred embodiment, a plain bearing is slidably positioned substantially surrounding a guide rail for sliding linear movement therebetween. A slider assembly includes a housing, the plain bearing positioned in the housing and provided with an axially extending slit, and the closure apparatus grounded to the housing and operatively engaging the bearing for adjustably closing the slit in the bearing to effect clearance reduction and/or braking between the bearing and the guide rail.

BRIEF DESCRIPTION OF THE DRAWINGS

FIG. 1 is a side view of a bearing/slider assembly slidably positioned on a guide rail and incorporating the unique aspects of the present invention.

FIG. 2 is a left end view of the bearing/slider assembly and guide rail of FIG. 1.

Figure 3:
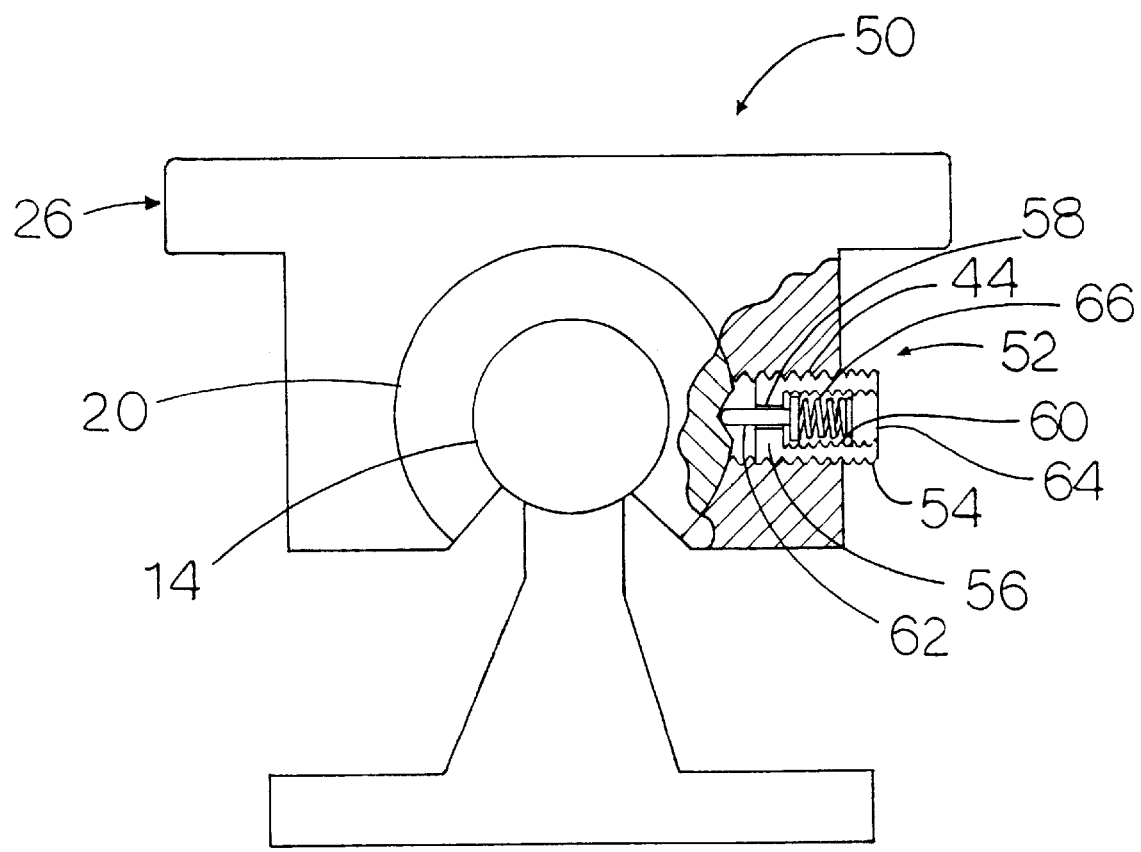
FIG. 3 is a left end view of a second embodiment of the present invention.

While the invention is susceptible of various modifications and alternative constructions, certain illustrated embodiments have been shown in the drawings and will be described below in detail. It should be understood, however, that there is no intention to limit the invention to the specific forms disclosed, but on the contrary, the intention is to cover all modifications, alternative constructions, and equivalents falling within the spirit and scope of the invention.

DETAILED DESCRIPTION OF THE INVENTION

Figure 13:
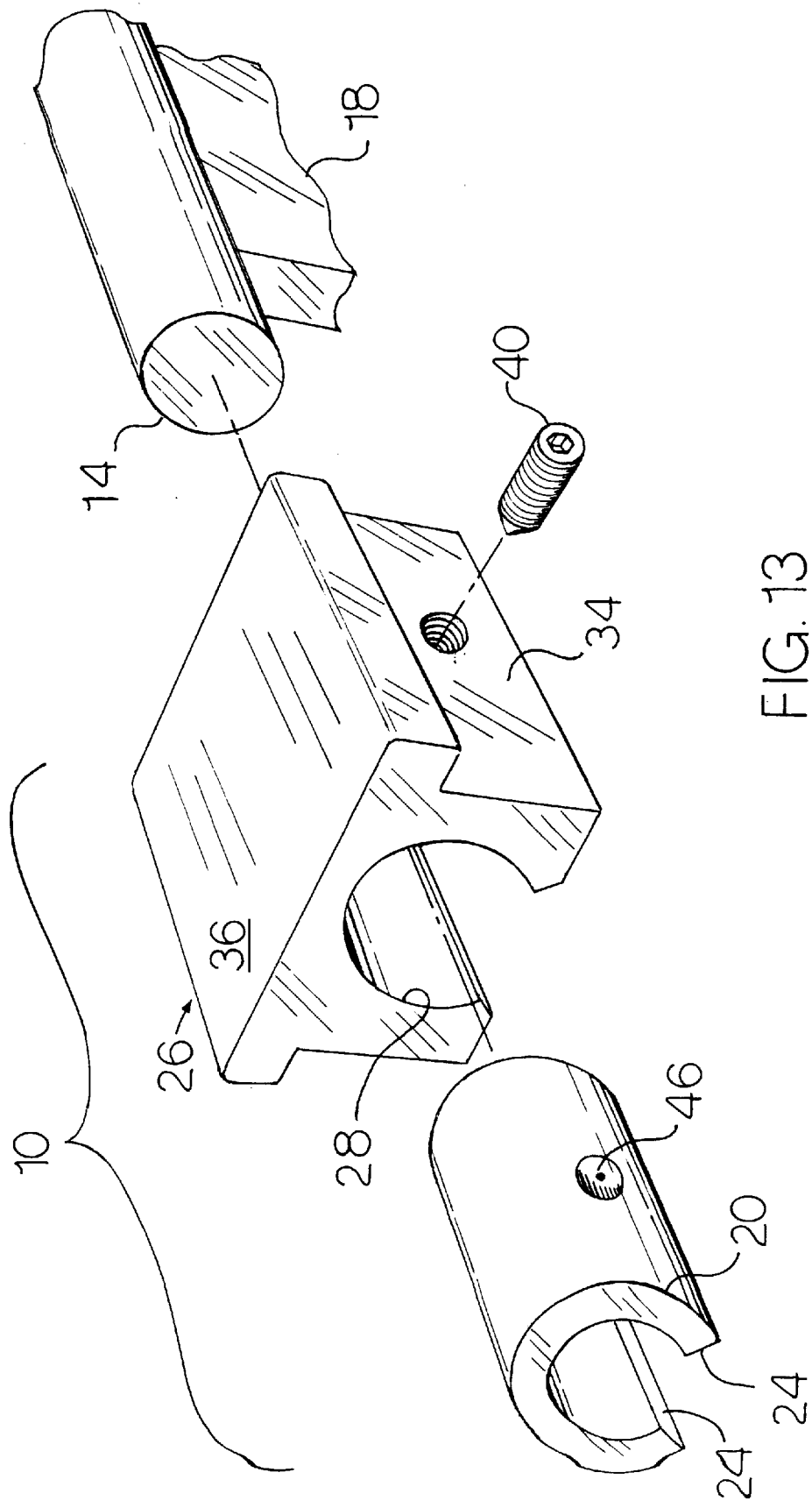
FIG. 13 is an exploded perspective view of the bearing/slider assembly of FIG. 1.

For purposes of illustration, a first embodiment of the present invention is shown in the drawings in FIGS. 1, 2 and 13 as embodied in a bearing/slider assembly 10 adapted for sliding on guide assembly 12. In this instance, the guide assembly 12 includes an elongated, cylindrical guide rail 14 supported on an elongated base 16 by way of a central elongated web 18 extending therebetween.

The slider assembly 10 includes a generally cylindrical plain bearing 20 having in inside diameter sized to slidably receive and substantially surround the guide rail 14 and having an axially extending slit defined between substantially opposing side walls 24 and through which the web 18 passes, a housing 26 provided with a bore 28 for snugly receiving the bearing. Optional or alternate means may also be provided for retaining the bearing in the bore 28 such as use of a pair of retaining rings (not shown) releasably secured in retaining ring grooves formed in the bore at each end of the bearing. The housing is provided with opposing side wall portions 34 having lower spaced end portions between which the web 18 passes, and a top wall portion 36 connecting the side wall portions.

With this arrangement, the slider assembly 10 is slidably positioned on the guide assembly 12, with a normal sliding or free running clearance between the outside diameter of the guide rail 14 and the inside diameter of the bearing 20 such that the slider assembly is adapted to slide longitudinally along the length of the guide rail. During a conventional use of the slider assembly, an object (not shown) may be connected to the housing, typically the top of the housing, such that the slider assembly slidably supports the object on the guide rail.

Conventional materials are suitable for use in the guide rail, the housing and the bearing of the present invention, and it is contemplated that material selection will be based on traditional factors such as operating temperature, the environment, interaction of the materials selected, and anticipated or desired life cycle considerations. By way of example only, the bearing may be formed from conventional materials such as brass, bronze, steel, aluminum, UHMW, nylon, ceramic metals, Teflon, plastic, Teflon composites, metallic shells with bonded coatings, and turcite. It is noted, however, that conventionally the bearing material selected is softer than the guide rail to insure wear of the bearing rather the guide rail.

In accordance with the present invention, the slider assembly 10 is provided with a clamping or closure apparatus adapted to operatively engage the bearing 20 for effecting reduction in the running clearance between the bearing and the guide rail 14, and for optionally imparting a frictional drag and/or braking force for positioning the bearing at a desired location on the guide rail.

More specifically, the closure apparatus is connected or grounded to one side of the housing, extends through an opening in that side to engage the bearing, and is adapted to impart a force on the bearing that elastically deforms the bearing, reducing the slit in the bearing and closing the bearing around the guide rail. The closure apparatus may be adapted to provide either a continuously adjustable force for controlling the clearance and/or friction between the bearing and the guide rail as desired, or adapted to operate between alternate discrete positions such as between free running clearance and braking the slider assembly in a position on the guide rail.

In the embodiment shown in FIGS. 1, 2 and 13, the slider assembly 10 is provided with a set screw 40 having an operative preferably semi-spherical or conical end 42 for engaging the side of the bearing 20 when threaded through a hole 44 extending through the side wall 34 of the housing 26. With this arrangement, as the set screw is turned inwardly into and then with increasing force against the bearing, with the internal hex drive (shown in dashed lines in FIG. 2) or other torque drive means (not shown) such as a slot in the free end of the set screw, the set screw collapses the bearing inwardly and reduces the clearance around the guide rail. Thus, the set screw permits analog-type adjustment of the bearing/shaft running clearance, from the free running clearance to the point of imparting a frictional drag, or sufficient friction to effect a braking force between the bearing and the guide rail. Advantageously, the set screw is utilized to maintain a constant bearing position between adjustments, and can be utilized to compensate for bearing wear by adjusting the bearing running clearance.

In preferred embodiments, the slider assembly 10 includes means for locking the set screw 40 (or other closure apparatus such as discussed below) in a fixed position between desired adjustments. By way of example only, the hole 44 may be tapped with a locking thread, a locking threaded insert (not shown) such as a heli-coil insert typically used in aluminum housings to provide a steel thread may be threaded into to hole 44 for receiving the set screw, or the set screw may be provided with a locking insert (not shown).

In addition, with a round guide rail and split cylindrical bearing such as in the embodiments shown, the set screw (or other closure apparatus) is preferably positioned to act radially with respect to the center of the guide rail and bearing. Such radial force action assists in providing balanced compression of the bearing in the housing, and in avoiding twisting or turning force with respect to the guide rail from adjusting the set screw. Such radial action is particularly advantageous in applications in which the angular position of the housing floats on the guide rail, contrasting, for example, the embodiments shown in FIGS. 10–12 (discussed further below) in which the housings are angularly fixed and may tolerate some twisting effect without substantially hindering normal operation of the slide assembly. It is further noted that, from a force-balance viewpoint, turning the set screw inwardly against the bearing results in a separating force between the associated housing side wall and the adjacent side of the bearing, and results in a force in the opposite housing side wall that tends to draw the opposite side of the bearing toward the set screw side, thus resulting in the clearance reduction around the guide rail.

Moreover, a radially centered conical depression 46 such as may be formed with a drill point is preferably formed in the outer wall of the bearing 20 for receiving the operative end 42 of the set screw 40 (or other closure apparatus) and for assisting in directing the clamping forces radially for radial stabilization of the slider assembly 10 on the guide rail 14.

Alternate closure apparatus embodiments in accordance with the present invention are adapted for maintaining a constant closing pressure on the bearing. Such constant pressure is particularly useful for automatically compensating for bearing wear, and maintaining a substantially constant frictional drag between the bearing and the guide rail.

The slider assembly 50 embodiment shown in FIG. 3 illustrates a spring-actuated closure device 52 adapted to maintain a substantially constant closing pressure on the bearing 20. In this instance, the closure apparatus includes a generally cylindrical body 54 having external threads for threading into the hole 44 in the side of the housing 26 and having an internal cavity 60 open and threaded at one end and terminating at the other end with a base 56 provided with a through hole 58 smaller in diameter than the internal cavity, a plunger 62 slidably positioned in the threaded body 54 and sized for extending through the opening 58 in the base of the body and for engagement with the side of the bearing, a plug 64 threaded into the internal threaded end of the body and provided with a slot or hex drive arrangement at its outer end, and a spring 66 positioned in the body between the head of the plunger and the base of the plug. With this arrangement, the spring force acting on the plunger and resulting in a closing force on the side of the bearing is adjusted by turning and adjusting the position of the spring retention plug 64, and can be set to a desired level to maintain a constant running clearance or frictional drag between the bearing and the guide rail 14.

Figure 4:
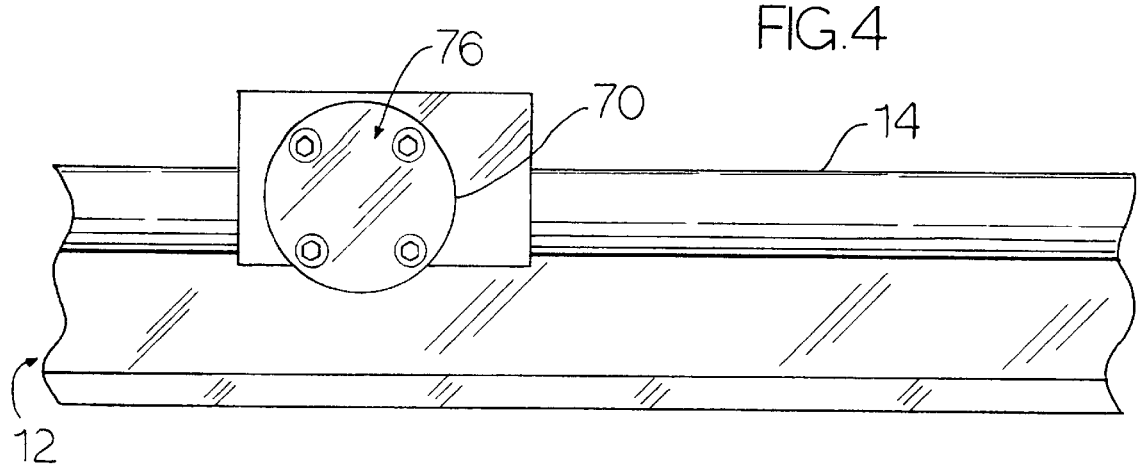
FIGS. 4 and 5 are side and left end views, respectively, of a third embodiment of the present invention.
Figure 5:
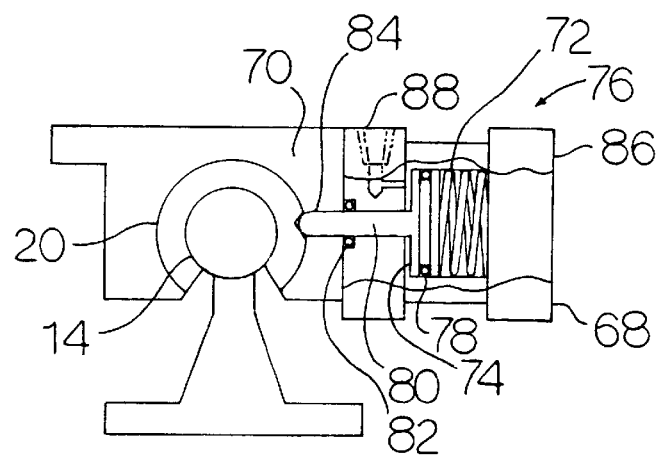

FIGS. 4 and 5 illustrate an alternate closure device 76 comprising a pneumatic or hydraulic cylinder 68 connected to the side of the slider housing 70 and equipped with a spring to bias the cylinder piston 74 toward the bearing 20. In this instance, the device 76 can be utilized to either maintain a constant closing pressure on the bearing, or to adjust the pressure as desired. To this end, the sliding piston 74 is positioned in the cylinder for axial movement therein and is provided with a seal 78 to close the chambers defined in the cylinder on either side of the piston, a plunger 80 is connected to the piston for movement therewith and extends through a seal 82 positioned in end of the cylinder and through the hole 84 in the side of the housing 70, the spring 72 acts between the cylinder head 86 and the piston to provide a continuous closing force on the bearing, and a hydraulic or pneumatic port 88 connected to a pressure supply (not shown) for selectively and adjustably pressurizing the chamber opposite the spring, to counteract the spring force and thus control the closing force acting on the bearing.

The closing device 76 of FIGS. 4 and 5 is particularly useful in providing a fail-safe braking arrangement for the associated slider assembly such as in the event of a failure of the pressure supply. In this instance, the spring force preload acting on the piston is sufficient to prevent movement of the slider assembly on the guide rail, and automatically brakes the slider assembly in the absence of counteracting pressure.

It will be apparent that alternate hydraulic and pneumatic cylinder arrangements are also contemplated within the scope of the present invention. For example, in an alternate embodiment (not shown), the cylinder of device 76 shown in FIGS. 4 and 5 is provided with means at the free end for adjusting the preload force of the spring as desired and similar in action to the spring force adjusting plug 64 of the device 52 shown in FIG. 3. Alternately, for example, a double acting cylinder (not shown) with a piston and plunger arrangement of device 76 for engaging the bearing 20 is provided with dual ports for supplying pressure to both sides of the piston, and is optionally provided with a piston biasing spring such as for effecting a failure-mode slider braking device.

Figure 6:
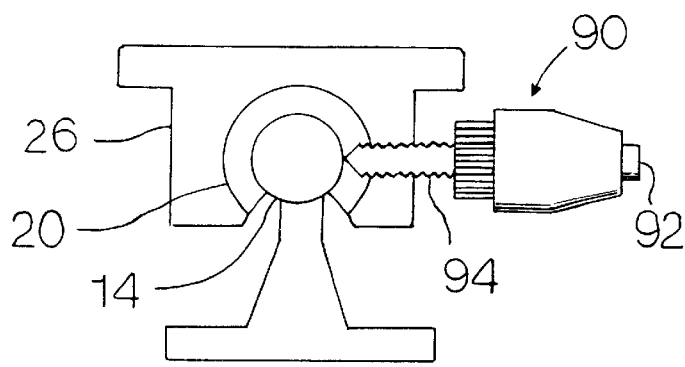
FIGS. 6 and 7 are left end and side views, respectively, of a fourth embodiment of the present inventiol.
Figure 7:
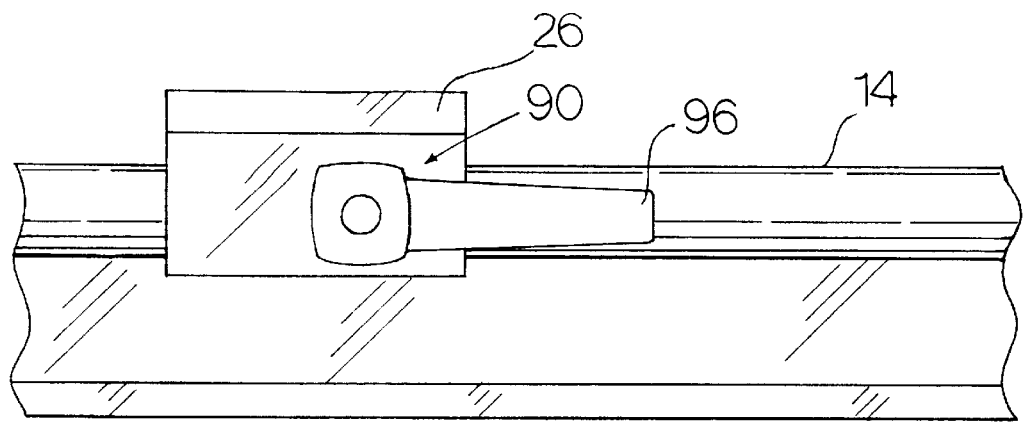
Figure 8:
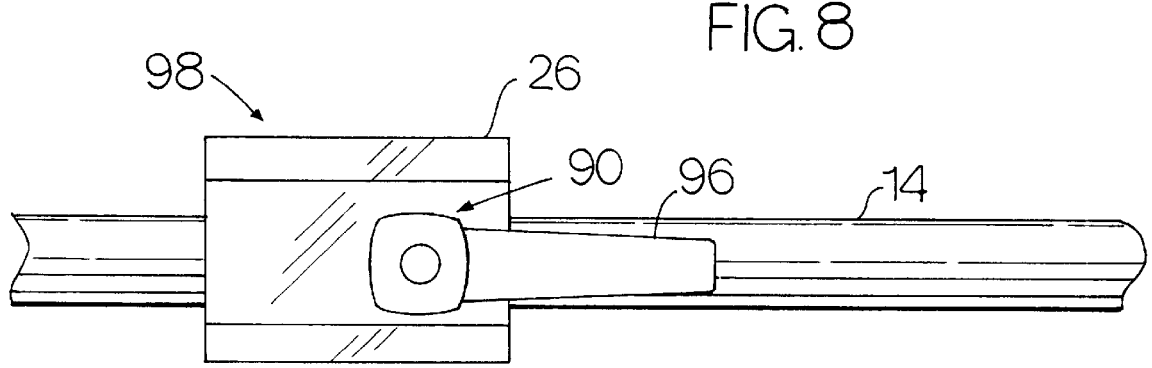
FIGS. 8 and 9 are side and left end views, respectively, of a fifth embodiment of the present invention.
Figure 9:
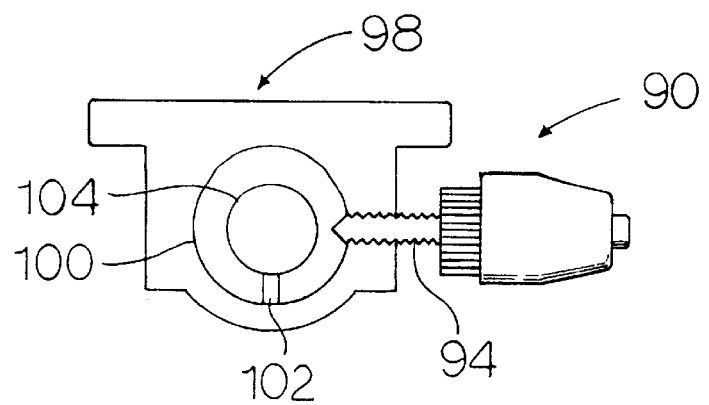

FIGS. 6–9 illustrate a threaded closure device similar in operation to the set screw 40 shown in FIGS. 1 and 2, but including a handle 96 connected to a threaded rod 94 for ease of adjusting the closing force acting on the bearing 20. In the embodiment shown, the handle includes a push button 92 to disengage the handle from the threaded rod, and permit rotation of the handle independently of the threaded rod to a desired position FIGS. 8 and 9 illustrate use of a slider assembly 98 including a substantially closed bearing 100 provided with a relatively small slit 102 such as is particularly useful in connection with a guide rail or cylindrical shaft 104 suspended from a base (not shown) at spaced locations. As will be evident from considering FIG. 9: (1) a conventional closed bearing slider application can be easily adapted for use with a device according to the invention by providing a small slit such as 102 in the bearing; (2) the slit in the bearing need not extend precisely axially, but may be formed at an angle from the longitudinal axis within certain limits determined by the application, and (3) a bearing (closure device according to the invention may be provided for use with a stationary housing and a sliding or rotating shaft.

Figure 10:
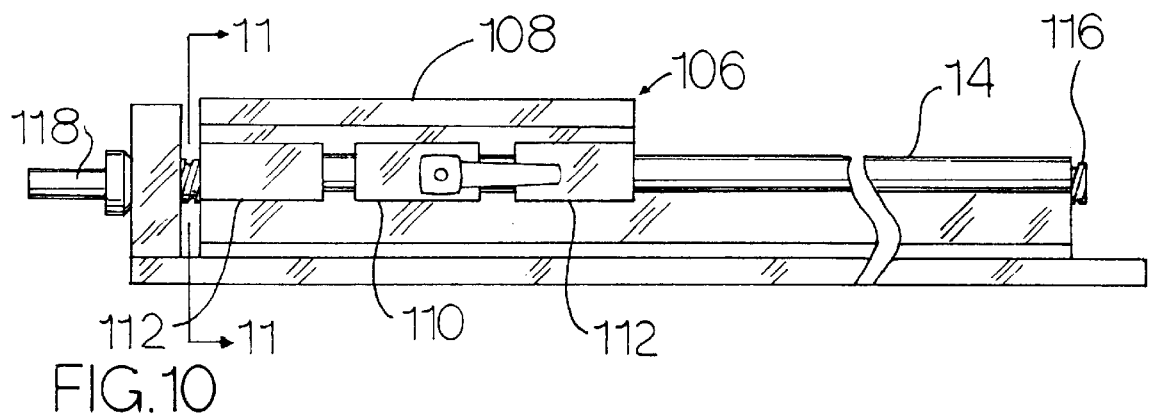
FIGS. 10 and 11 are side and left end views, respectively, of the embodiment shown in FIGS. 6 and 7, and adapted for use with a table linearly positioned with a threaded drive.
Figure 11:
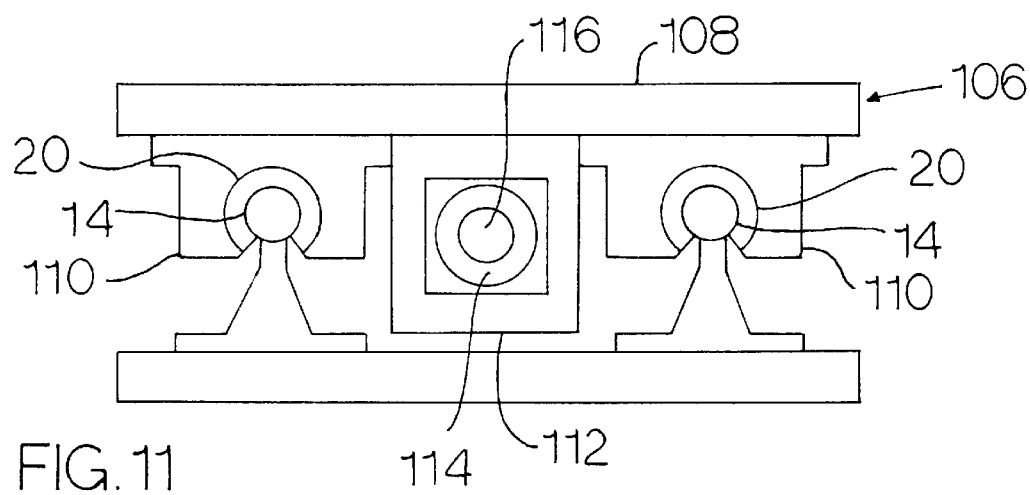

FIGS. 10 and 11 illustrate a linear ball bearing slide having a carriage 106 with a table 108 for supporting or connection to an object (not shown) and adapted to be linearly positioned along a pair of spaced guide rails 14 with a ball screw actuator. In this instance, a pair of laterally spaced slide assemblies 110 connected to the bottom of a table slide along the guide rails. Longitudinally spaced housings 112 also connected to the table centrally of the guide rails are provided with linear ball bearings 114 positioned on a ball screw 116 such that the table actuates linearly along the guide rails as the ball screw is rotatably driven with means (not shown) connected to the drive shaft coupling 118 at one end of the ball screw. Closure apparatus in accordance with the invention, such as the threaded closure 90 of FIGS. 6 and 7, provide for adjustment of the clearance between the bearings 20 and the guide rails 14, and/or application of friction or braking forces as previously described.

Figure 12:
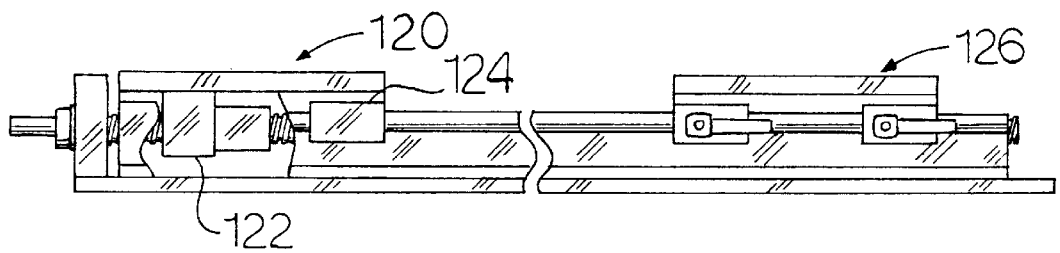
FIG. 12 is a side view of the embodiment shown in FIGS. 6 and 7, and adapted for use with a stationary table in combination with a second table that is linearly positionable with a threaded drive.

FIG. 12 illustrates a second slide arrangement adapted for use with a linear ball bearing. This arrangement includes a driven carriage 120 having conventional slides 124 and linear ball bearings 122 engaging the ball screw, and a free floating carriage 126 that is manually slid into a desired position on the guide rail, and locked into position with closure device such as device 90 to limit the stroke of the driven carriage.

Those skilled in the will recognize that still other alternate closure apparatus may be provided within the scope of the present invention as described and contemplated herein, and that existing or conventional slide arrangements and other plain bearing applications can easily be adapted for use with closure apparatus according to invention by, for example, drilling a hole through a housing side wall and touching the drill point into the side of the bearing, and then tapping the hole or otherwise providing for connection of the desired bearing closure apparatus to the housing. By way of example only, a bearing closure device as contemplated herein is suitable for use with certain guide rails of non-circular cross-section.

From the foregoing, it will be apparent that the present invention brings to the art a new and improved plain bearing brake and tensioning device which is uniquely operable to compensate for bearing wear, and/or to provide a friction and braking force between the bearing and a shaft or guide rail.

We claim:

1. A plain bearing apparatus comprising:

a shaft member extending longitudinally along an axis;

a housing having two opposing side wall portions and a top wall portion connected between said side wall portions, said housing having a first opening extending therethrough along said axis between said side wall portions and having a second opening extending through one of said side wall portions and into said first opening;

a plain bearing located in said first opening and slidably positioned on said shaft member for relative movement therebetween, said plain bearing having a slit extending generally parallel with said axis; and means connected to said one side wall portion and extending through said second opening for operably engaging the bearing to effect selective closure of the bearing around the shaft member.

2. The plain bearing apparatus of claim 1 in which said effecting means includes a screw member threaded into said second opening and engaging the bearing for establishing the running clearance between the shaft member and the bearing.

3. The plain bearing apparatus of claim 1 in which said effecting means is slidably positioned in said second opening and engaging the bearing for establishing the closing force acting on the bearing.

4. A linear sliding guide bearing apparatus comprising:
a base;
an axially extending guide rail connected to said base;
a slider assembly comprising:
a housing having two opposing side wall portions and a top wall portion connected between said side wall portions, said housing having a first opening extending therethrough along said axis between said side wall portions and having a second opening extending through one of said side wall portions and into said first opening, and
a plain bearing located in said first opening and slidably positioned on said guide rail, said plain bearing having a slit extending generally parallel with said axis; and
means connected to said one side wall portion and extending through said second opening for operably engaging the bearing to effect selective closure of the bearing around the guide rail.

5. The linear sliding guide bearing apparatus of claim 2 in which said effecting means includes a screw member threaded into said second opening and engaging the bearing for establishing the running clearance between the shaft member and the bearing.

6. The linear sliding guide bearing apparatus of claim 2 in which said effecting means is slidably positioned in said second opening and engaging the bearing for establishing the closing force acting on the bearing.

7. A plain bearing apparatus comprising:
a shaft member extending longitudinally along an axis;
a housing having
a first opening extending coincident with said axis,
a first side wall portion, and
a second opening extending through the first side wall portion and into said first opening;
a split plain bearing located in said first opening and slidably positioned on the shaft member; and
means extending through said second opening and operably engaging the bearing for effecting selective closure of the bearing on the shaft member.

8. The plain bearing apparatus of claim 7 in which said effecting means engages the bearing radially with respect to said axis for effecting closure of the bearing.

9. The plain bearing apparatus of claim 8 in which the bearing is formed with a radially centered depression, and said effecting means includes an operative end received in and engaging said depression for effecting closure of the bearing.

10. The plain bearing apparatus of claim 7 in which the bearing is split longitudinally with respect to said axis.

11. The plain bearing apparatus of claim 7 in which said housing further comprises a second side wall portion located oppositely of said first wall portion with respect to said axis, and a third wall portion connecting said first and second wall portions, said effecting means being operable to draw said second wall portion in a direction toward said first wall portion to assist in effecting closure of the bearing.

12. The plain bearing apparatus of claim 7 in which said effecting means includes a screw member threaded into said second opening and engaging the bearing for establishing the running clearance between the shaft member and the bearing.

13. The plain bearing apparatus of claim 7 in which said effecting means is slidably positioned in said second opening and engaging the bearing for establishing the closing force acting on the bearing.

14. A linear sliding guide bearing apparatus comprising:
a base;
an axially extending guide rail connected to said base;
a slider assembly comprising:
a housing having
a first opening extending coincident with said axis,
a first side wall portion, and
a second opening extending through the first side wall portion and into said first opening; and
a split plain bearing located in said first opening and slidably positioned on the guide rail; and
means extending through said second opening and operably engaging the bearing for effecting selective closure of the bearing on the guide rail.

15. The linear sliding guide bearing apparatus of claim 14 in which said effecting means engages the bearing radially with respect to said axis for effecting closure of the bearing.

16. The linear sliding guide bearing apparatus of claim 15 in which the bearing is formed with a radially centered depression, and said effecting means includes an operative end received in and engaging said depression for effecting closure of the bearing.

17. The linear sliding guide bearing apparatus of claim 14 in which the bearing is split longitudinally with respect to said axis.

18. The linear sliding guide bearing apparatus of claim 14 in which said housing further comprises a second side wall portion located oppositely of said first wall portion with respect to said axis, and a third wall portion connecting said first and second wall portions, said effecting means being operable to draw said second wall portion in a direction toward said first wall portion to assist in effecting closure of the bearing.

19. The linear sliding guide bearing apparatus of claim 14 in which said effecting means includes a screw member threaded into said second opening and engaging the bearing for establishing the running clearance between the shaft member and the bearing.

20. The linear sliding guide bearing apparatus of claim 14 in which said effecting means is slidably positioned in said second opening and engaging the bearing for establishing the closing force acting on the bearing.

* * * * *